United States Patent [19]
Yonemitsu et al.

[11] Patent Number: 6,061,404
[45] Date of Patent: May 9, 2000

[54] METHOD AND APPARATUS FOR ENCODING DIGITAL SIGNAL

[75] Inventors: Jun Yonemitsu; Motoki Kato, both of Kanagawa, Japan

[73] Assignee: Sony Corporation, Tokyo, Japan

[21] Appl. No.: 09/008,060

[22] Filed: Jan. 16, 1998

[30] Foreign Application Priority Data

Jan. 27, 1997 [JP] Japan ..................................... 9-012807

[51] Int. Cl.$^7$ .................................................. H04B 14/04
[52] U.S. Cl. ............................. 375/242; 714/708; 369/60
[58] Field of Search .................................... 375/242, 246; 360/48; 369/59, 60; 714/47, 708, 745; 370/229–240

[56] References Cited

U.S. PATENT DOCUMENTS

| | | | |
|---|---|---|---|
| 4,920,534 | 4/1990 | Adelmann et al. | 370/474 |
| 5,159,447 | 10/1992 | Haskell et al. | 348/419 |
| 5,276,676 | 1/1994 | Horn et al. | 370/234 |
| 5,553,048 | 9/1996 | Maeda | 369/60 |
| 5,566,208 | 10/1996 | Balakrishnan | 375/240 |
| 5,606,539 | 2/1997 | De Haan et al. | 369/59 |

*Primary Examiner*—Stephen Chin
*Assistant Examiner*—Lenny Jiang
*Attorney, Agent, or Firm*—Frommer Lawrence & Haug, LLP.; William S. Frommer

[57] ABSTRACT

An apparatus and a method of encoding a digital signal with which a transmission buffer (an encoder buffer) does not overflow even if recording of a signal on a recording medium is temporarily inhibited attributable to, for example, an external shock or even if transmission of a signal by broadcast or communication is temporarily inhibited because of unsatisfactory state of communication. In a case where recording on an optical disk is temporarily inhibited and an output of data from an encoder is interrupted attributable to, for example, an external shock during an operation for recording a bit stream obtained by encoding a video signal on the optical disk, an encoding bit rate is lowered. Thus, a fact that the encoder buffer overflows can be prevented.

18 Claims, 4 Drawing Sheets

METHOD AND APPARATUS FOR ENCODING DIGITAL SIGNAL

BACKGROUND OF THE INVENTION

1. Field of the Invention

The present invention relates to a method and an apparatus for encoding digital signals whereby a transmission side of a system is able to satisfactorily encode digital signals at variable bit rates so as to transmit encoded signals to a receiving portion.

2. Description of Prior Art

When digital video signals, which have great quantities of information, are, for a long time, recorded on a small recording medium having a poor storage capacity, or when digital video signals of the foregoing type are transmitted through a multiplicity of channels in a transmission passage having only a limited capacity, a means is required which is capable of efficiently encoding the digital video signals.

FIG. 1 is a block diagram showing the structure of a system for compressing and encoding video image signals composed of a plurality of images (pictures) and taken as an example of the digital signals. Then, the compressed and encoded video signals are recorded on an optical disk taken as an example of the recording medium.

Referring to FIG. 1, a terminal 200 is supplied with video signal S31, and a terminal 201 is supplied with encoding bit rate Renc with which the video signal S31 is encoded. A rate controller 209 instructs required quantity S35 of bits of the supplied pictures which must be encoded in accordance with the encoding bit rate Renc. The video encoder 202 encodes the supplied pictures in such a manner that the quantity is made to be the required quantity S35 of bits which must be encoded. Actual bit quantity S36 realized attributable to the encoding operation is communicated to a rate controller 209. Encoded bit stream S32 obtained as a result of the compressing and encoding operation performed by the video encoder 202 is supplied to a transmission buffer (hereinafter called an "encoder buffer") 203. The encoder buffer 203 smoothes changes in the generated quantity of codes of each supplied picture to output a bit stream at the predetermined bit rate Renc. Bit stream S33 read from the encoder buffer 203 is supplied to a multiplexer 204. Another encoded bit stream obtained by compressing and encoding, for example, an audio signal, is supplied to the multiplexer 204 although the foregoing fact is omitted from illustration. The multiplexer 204 multiplexes a plurality of the supplied bit streams in a time division manner so that one bit stream is formed. An error correction code is, by an ECC encoder 205, added to the bit stream transmitted from the multiplexer 204, and then the bit stream is transmitted to a modulation circuit 206. The ECC encoder 205 subjects the output of the ECC encoder 205 to a predetermined modulation process, for example, an 8–modulation. An output of the modulation circuit 206 is transmitted to a recording head 207 so that the signal S34 is recorded on the optical disk 208.

When the system shown in FIG. 1 is a portable apparatus, an external shock or the like sometimes makes the recording head 207 to temporarily be impossible to record the signal S34 on the optical disk 208 during the operation of the recording head 207 for recording the signal S34 on the optical disk 208.

In the foregoing case, the operation for reading (transmitting) data S33 from the encoder buffer 203 is interrupted. If supply of data S32 at the bit rate Renc to the encoder buffer 203 is attempted to be continued, the encoder buffer 203 finally overflows. An example of the quantity of bits which share the encoder buffer 203 at the foregoing time is shown in FIG. 2.

The abscissa t of a graph shown in FIG. 2 stands for a lapse of time and axis of ordinate stands for an amount of the quantities of bits of data S32 supplied to the encoder buffer 203 until certain time. The gradient of a line e-f-g of the line graph at time t indicates reading (output) rate Rout with which data S33 is read from the encoder buffer 203. The graph shows an example in which reading (output) of data S33 from the encoder buffer 203 is interrupted at time t=E(n). The vertical distance from the line e-f-g and line a-b-c indicates size BB of the encoder buffer 203. The size BB is a constant value. The vertical distance from line e-d and line p-q indicates size B of a virtual code buffer for use in a rate controlling operation. The size B and the size BB have the relationship satisfying $B \leq BB$. The code buffer is included in the encoder buffer 203. The size B of the code buffer is generally the same as the size of a receiving buffer (a decoder buffer).

Symbols A (i) represent an i-th encoded picture and the vertical size of symbols A (i) indicates the quantity of bits of the encoded data, while symbols E (i) represent time at which the i-th encoded picture A (i) is encoded. Pictures are encoded at intervals (that is, E (i+1)–E (i)) of 1/29.97 second in a case of so-called NTSC video signals and at intervals of 1/25 second in a case of so-called PAL video signals.

Changes in the quantity of bits which share the encoder buffer are indicated by regions having diagonal lines between a zigzag line and the line e-f-g. A movement of the zigzag line in the direction of the axis of ordinate indicates a fact that an encoded picture has instantaneously supplied to the encoder buffer. On the other hand, a movement of the zigzag line in the direction of the abscissa indicates a fact that supply of a bit stream to the encoder buffer has been interrupted and a bit stream has been transmitted from the encoder buffer at a bit rate Rout indicated by the gradient of the line e-f-g. That is, picture A (0) is instantaneously supplied to the encoder buffer at time t=E (0) so that the quantity of bits sharing the encoder buffer is enlarged by the quantity of bits of the picture A (0). Then, a bit stream is transmitted from the encoder buffer at bit rate Rout until time t=E (1). Therefore, the quantity of bits sharing the encoder buffer is reduced as time elapses. Bits of picture A (1) are instantaneously supplied to the encoder buffer at time t=E (1) so that the quantity of bits sharing the encoder buffer is enlarged by the quantity of bits of picture A (1). Then, similar operations are performed so that pictures are supplied to the encoder buffer at predetermined intervals. The video encoder determines a required quantity of bits of a next picture to be encoded in such a manner that the zigzag line is placed between the line e-d and the line p-q. Then the video encoder encodes the picture. The required quantity S35 of bits of the picture which must be encoded shown in FIG. 1 is calculated as described above.

Referring to FIG. 2, the encoding operation is normally performed in the period from time t=E (0) to time t=E (n) so that data is transmitted from the encoder buffer at a bit rate which is the same as the encoding bit rate. Transmitted data is recorded on the optical disk.

If supply of the bit stream to the encoder buffer at the bit rate Renc is continued though reading of data from the encoder buffer has been interrupted at time t=E (n), the encoder buffer finally overflows. As a result, the encoded bit stream is lost and any bit stream cannot normally be produced. Thus, there arises a problem in that an image is disordered when the optical disk is reproduced and the obtained signal is reproduced by the decoder portion. That is, when the encoded bit stream has been reproduced by the decoder portion, there arises a problem in that a reproduced image is disordered and frozen.

Even if an arrangement is employed in which the encoding operation is temporarily interrupted before the encoder buffer overflows, any encoded bit stream does not exists in the period of the interruption. Thus, there arises a problem in that reproduced images are discontinuous when the encoded bit stream is reproduced by the decoder portion.

If recording of the signal S34 on the optical disk 208 is temporarily inhibited because of, for example, a shock administered from outside to the recording head 207 shown in FIG. 1, the conventional structure encounters a problem in that the encoding operation cannot satisfactorily be performed because of insufficient control of the encoding bit rate.

When a bit stream of the foregoing type is transmitted by a broadcast or communication arranged, even a system arranged in such a manner that transmission is temporarily inhibited if a state of communication is unsatisfactory and output of a transmission buffer from the encoder is interrupted encounters an overflow of the transmitting buffer occurring because of the foregoing reason. As a result, the encoding bit rate is undesirably lost and thus the receiving portion cannot obtain a normal reproduced image. That is, when the encoded bit stream has been reproduced by the decoder portion, there arises a problem in that a reproduced image is disordered and frozen.

OBJECT AND SUMMARY OF THE INVENTION

In view of the foregoing, an object of the present invention is to provide a method and an apparatus for encoding a digital signal with which a transmission buffer (an encoder buffer) does not overflow even if recording of a signal on a recording medium is temporarily inhibited attributable to, for example, an external shock or even if transmission of a signal by broadcast or communication is temporarily inhibited because of an unsatisfactory state of communication. As a result, the decoder portion is able to obtain a satisfactory reproduced signal.

The present invention is effective when applied to a system arranged to record or transmit a signal obtained by compressing and encoding a digital signal and having a possibility that a state in which recording or transmission is temporarily inhibited attributable to an external shock or an unsatisfactory state of transmission and output of data from a transmission buffer is interrupted. The method and apparatus for encoding a digital signal according to the present invention is able to overcome the above-mentioned problem by administrating the quantity of bits which share the transmission buffer and by controlling the encoding bit rate (or the quantity of bits allocated to a digital signal in each predetermined time) in accordance with the quantity of bits which share the transmission buffer.

When data can be transmitted from the transmission buffer, the output bit rate from the transmission buffer is controlled in accordance with the quantity of bits which share the transmission buffer. It is preferable that the size of the transmission buffer is larger than the size of a virtual buffer which is used to control the rate (or the size of a receiving buffer required for the reproducing portion or the receiving portion).

When the encoding bit rate (or the quantity of bits which are allocated to a digital signal in each predetermined time) is controlled, a parameter indicating a degree of danger that the transmission buffer overflows is calculated in accordance with the quantity of bits which share the transmission buffer. Then, the control is performed in such a manner that the encoding bit rate is lowered in inverse proportion to the degree of the danger that the transmission buffer overflows. Thus, the degree of danger that the transmission buffer overflows is lowered.

When the output bit rate from the transmission buffer is controlled, the output bit rate from the transmission buffer is raised as compared with the encoding bit rate when the degree of danger of overflow of the transmission buffer indicated by the parameter is high. Thus, the degree of danger that the transmission buffer overflows can be lowered.

Other and further objects, features and advantage of the invention will be appear more fully from the following description.

DETAILED DESCRIPTION OF THE INVENTION

An embodiment of an apparatus for encoding a digital signal using a method of encoding a digital signal according to the present invention will now be described with reference to the drawings.

Figure 3:
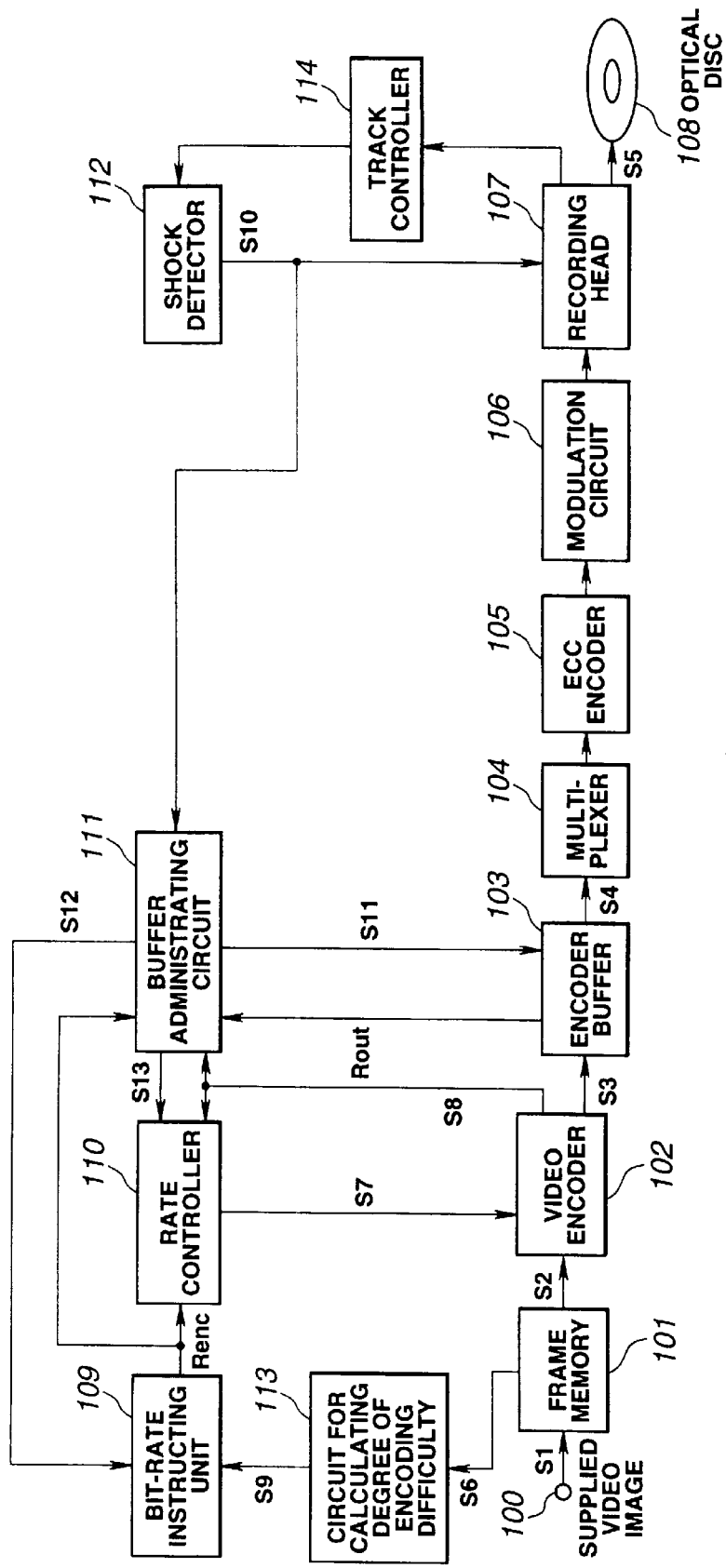
FIG. 3 is a block diagram showing a circuit in an apparatus for encoding a digital signal to which a method of encoding a digital signal (a method of encoding a variable bit rate) is applied.

FIG. 3 is a block diagram showing a circuit in an apparatus for encoding a video image using the method of encoding a digital signal according to the present invention. The apparatus for encoding a video image uses an MPEG method to compress and encode a supplied video image.

The operation will now be described which is performed when an encoding operation has been performed normally, data has been transmitted from an encoder buffer at a bit rate which is the same as an encoding bit rate and data above is recorded on, for example, an optical disk.

Video signal S1 supplied through a terminal 100 is stored in a frame memory 101. A circuit 113 for calculating a degree of difficulty in encoding data calculates difficulty degree S9 in encoding image data S6 which is stored in the frame memory 101. A bit-rate instructing unit 109 calculates encoding bit rate Renc in each predetermined time in accordance with difficulty degree S9 in each predetermined time. Then, the bit-rate instructing unit 109 instructs the rate controller 110 of the encoding bit rate Renc. It is preferable that the predetermined time is about 0.5 second. Methods of calculating the difficulty degree in encoding data and the encoding bit rate Renc have been disclosed in Japanese Patent Application No. 7-108860 and Japanese Patent Application No. 7-311418 by the applicant of the present invention.

The schematic structure of the circuit 113 for calculating a degree of difficulty in encoding data will now be described. The circuit 113 for calculating a degree of difficulty in encoding data obtains the difficulty degree which stands for the statistical characteristic or the image characteristic of the supplied image signal. The circuit 113 for calculating a degree of difficulty in encoding data includes a portion for analyzing information in a frame and a portion for analyzing statistical information between frames. The portion for analyzing information in a frame calculates the image characteristic of a supplied image including, for example, statistical information about the brightness, chromaticity and the flatness of the supplied image. The portion for analyzing information between frames calculates the image characteristic of the supplied image, including, for example, statistical information about the quantity of movement of the video image. Information about the image characteristic will specifically be described. Statistical information about the brightness of the supplied image is obtained by calculating an average value of brightness information in each time. Statistical information about the chromaticity of the supplied image is obtained by calculating an average value of, for example, chromaticity signals in each time. Statistical information of the flatness of the supplied image is obtained by calculating dispersed values of, for example, brightness signals in each predetermined time. Statistical information of the quantity of movement of the supplied image is obtained by calculating an average value of, for example, quantities of movement vectors, in each predetermined time.

The bit-rate instructing unit 109 obtains encoding bit rate Renc in accordance with encoding difficulty degree S9 supplied from the circuit 113 for calculating a degree of encoding difficulty. Specifically, the bit-rate instructing unit 109 obtains encoding bit rate Renc in each predetermined time. The encoding bit rate Renc is obtained in accordance with the average value and dispersed values of the brightness of the supplied image signals in each predetermined time. Moreover, the average value of the chromaticity signals of the supplied image signal in each predetermined time and the average value of the quantities of the movement vectors of the supplied image signal in each predetermined time are used. In addition, the total quantity of data which can be used and which is determined in accordance with the capacity of a recording medium for storing data and the bit rate of the transmission passage.

In accordance with the encoding bit rate Renc, the rate controller 110 instructs required quantity S7 of bits of picture S2 which must be encoded and which is supplied from the frame memory 101. A video encoder 102 encodes the picture S2 in such a manner that the quantity is made to be the required quantity S7 of bits which must be encoded. Quantity S8 of bits generated at this time is communicated to a rate controller 110. Encoded bit stream S3 supplied from the video encoder 102 is supplied to an encoder buffer 103. The required quantity S7 of bits which must be encoded can be considered as an allocated quantity of bits. A method of calculating the required quantity S7 of bits which must be encoded will be described later.

A multiplexer 104 reads bit stream S4 from the encoder buffer 103 at multiplexing bit rate Rmux. The multiplexing bit rate Rmux is a value larger than the encoding bit rate Renc. When the bit stream S4 has been stored in the encoder buffer 103, the multiplexer 104 reads the bit stream S4 from the encoder buffer 103 at the multiplexing bit rate Rmux in a predetermined time period. In another time period, the multiplexer 104 does not read data from the encoder buffer 103 and reads another bit stream of, for example, audio data (not shown). Thus, the multiplexer 104 multiplexes data. As described above, the bit stream is intermittently read from the encoder buffer 103 at the multiplexing bit rate Rmux and zero. If the encoding operation and the operation for reading data from the encoder buffer 103 are performed normally, an average value of the foregoing intermittent reading operation in each predetermined time is the same as the encoding bit rate Renc. The multiplexer 104 multiplexes the bit stream S4 and another supplied bit stream (a bit stream of audio data or the like) in a time division manner to unify the bit streams into one bit stream. An error correction code is added to the formed bit stream by an ECC encoder 105. Then, the bit stream is supplied to a modulation circuit 106. In the modulation circuit 106, an output of the ECC encoder 105 is subjected to a predetermined modulation process, for example, 8–modulation. An output of the modulation circuit 106 is supplied to a recording head 107. The recording head 107 records signal S5 on an optical disk 108. A track controller 114 administrates a track on the encoder buffer 103, which must be traced by the recording head 107, and a track which is being traced by the recording head 107.

If the encoding operation and the operation for reading data from the encoder buffer 103 are normally performed, the encoder system according to this embodiment is operated as described above.

The operation of the encoder system according to this embodiment will now be described which is performed when the recording head 107 is temporarily brought to a state in which it cannot record the signal S5 on the optical disk 108.

If the recording head 107 is shocked to an extent it cannot record the signal S5 which must be recorded, a shock detector 112 issues recording interruption command S10 to the recording head 107. As a result, the recording operation is interrupted. The shock detector 112 detects whether or not the system has been shocked to an extent with which the recording operation cannot be performed in accordance with a track error signal supplied from the track controller 114. The shock detector 112 may include a unit for detecting an acceleration applied to the system to determine whether or not the system has been shocked to the extent with which the recording operation cannot be performed in accordance with the detected acceleration. As a matter of course, both track error and the acceleration may be detected to detect the shock.

The recording interruption command S10 is also supplied to a buffer administrating circuit 111. Thus, the buffer administrating circuit 111 issues, to the encoder buffer 103, a command S11 for interrupting an output from the encoder buffer 103.

The buffer administrating circuit 111 calculates parameter S12 indicating a degree of danger for the encoder buffer 103 to overflow and quantity S13 of bits sharing a virtual code buffer for use to control the rate. The virtual code buffer is included in the encoder buffer 103. The size of the virtual code buffer is the same as the size of a receiving buffer (the size of a decoder) in the decoder portion. The parameter S12 will be described later.

The bit-rate instructing unit 109 calculates encoding bit rate Renc in each predetermined time in accordance with the degree S9 of difficulty in encoding image data S6 and the parameter S12. The bit-rate instructing unit 109 performs control in such a manner as to lower the encoding bit rate Renc in inverse proportion to the degree of danger for the encoder buffer 103 to overflow which is indicated by parameter S12 as compared with the encoding bit rate Renc calculated with respect to the encoding difficulty degree S9 in each predetermined time in a normal recording state. The control may be performed in such a manner that the encoding bit rate Renc is lowered when the recording interruption command S10 has been issued as well as the case where the encoder buffer 103 overflows.

In accordance with the quantity S13 of bits sharing the virtual code buffer, the rate controller 110 instructs the video encoder 102 of a required quantity S7 of bits of the next picture which must be encoded.

Figure 1:
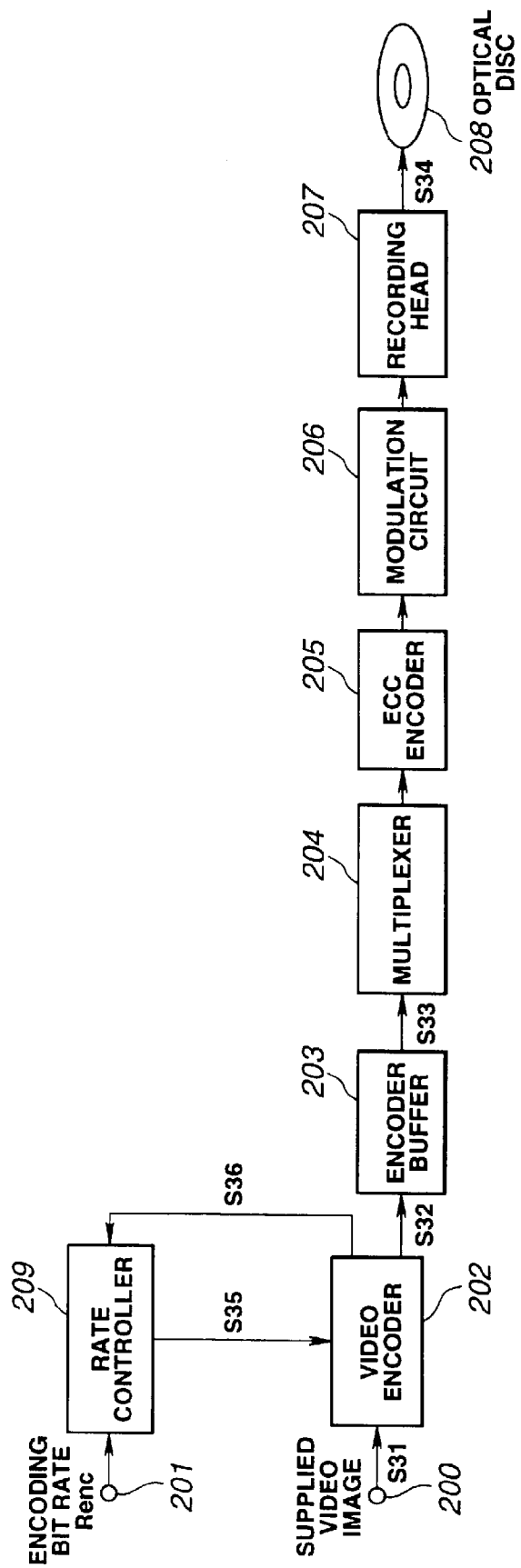
FIG. 1 is a block circuit diagram schematically showing a conventional apparatus for encoding a video image.
Figure 2:
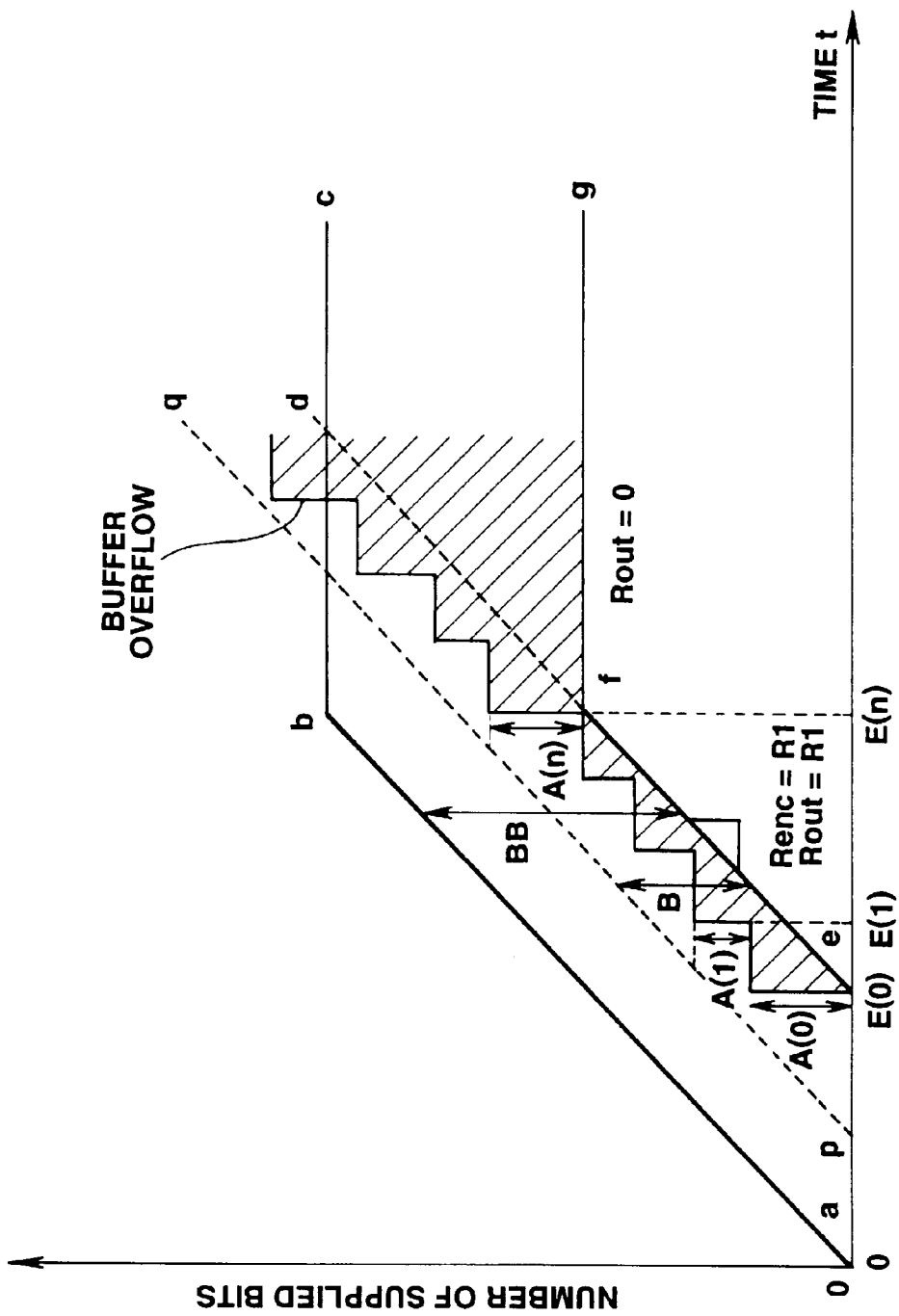
FIG. 2 is a graph showing an example of change in the quantity of bits sharing an encoder buffer (a transmission buffer) of the conventional apparatus for encoding a video image.

A method of controlling the encoding bit rate Renc and the required quantity S7 of bits which must be encoded will now be described with reference to FIG. 4. Similarly to FIG. 2, Fig. 4 shows an example of change in the quantity of bits sharing the encoder buffer 103.

Figure 4:
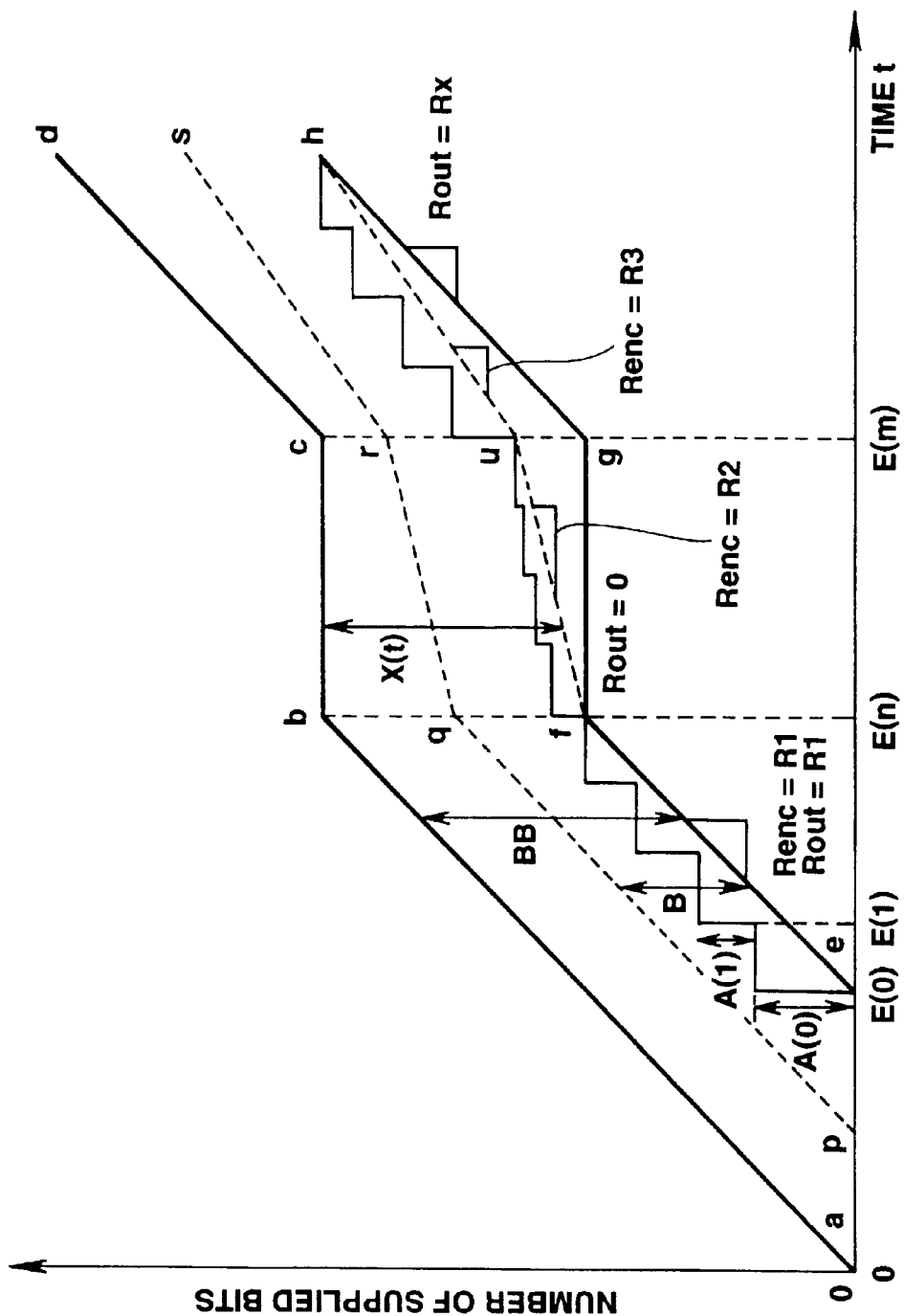
FIG. 4 is a graph showing an example of change in the quantity of bits sharing an encoder buffer (a transmission buffer) of an embodiment of the apparatus for encoding a video image according to the present invention.

Referring to FIG. 4, abscissa t stands for a lapse of time and axis of ordinate stands for an amount of bits of the encoded bit stream S3 which is supplied to the encoder buffer 103 until certain time. The gradient of line e-f-g-h at time t indicates bit rate Rout with which the bit stream S4 is read (output) from the encoder buffer 103. The output bit rate Rout is an average value of bit rates of data which is read from the encoder buffer 103 by the multiplexer 104 at each predetermined time. In this case, reading (output) of the bit stream S4 from the encoder buffer 103 is interrupted in a period of time from time t=E (n) to time t=E (m). The vertical distance from the line e-f-g-h to line a-b-c-d indicates the size BB of the encoder buffer 103. The size BB is a constant value. The vertical distance from line e-f-u-h to line p-q-r-s indicates size B of a virtual code buffer for use to control the rate. The sizes B and BB has the relationship satisfying B<BB. The size B of the code buffer is generally the same as the size of a receiving buffer (the decoder buffer) in the decoder portion.

In a period from t=E (0) to t=E (n), the encoding operation is normally performed and the bit stream obtained as a result of the normal encoding operation is recorded on the optical disk 108. Assuming that the encoding bit rate Renc at this time is R1, the output bit rate Rout from the encoder buffer 103, that is, the gradient of the line e-f is encoding bit rate R1.

In a period from t=E (n) to t=E (m), the operation for reading data from the encoder buffer 103 is interrupted. Since data is continuously supplied from the video encoder 102 to the encoder buffer 103, the quantity of bits sharing the encoder buffer 103 is enlarged. The system according to this embodiment is arranged to prevent a fact that the encoder buffer 103 overflows. To achieve this, the encoding bit rate Renc is controlled to be smaller than R1 and the relationship as Renc=R2 is satisfied even if the difficulty degree S9 in encoding image data S6 at each predetermined time is the same as the encoding difficulty degree in the period from t=E (0) to t=E (n).

The recording interruption command S10 is suspended from time t=E (m) so that the signal S5 is recorded on the optical disk 108. Therefore, reading of data from the encoder buffer 103 is started. Since the quantity of bits sharing the encoder buffer 103 is enlarged in the initial state, the probability that the encoder buffer 103 overflows is lowered. To achieve this, the encoding bit rate Renc is controlled to be smaller than R1 even if the encoding difficulty degree S9 at each predetermined time is the same as the degree of encoding difficult in the period from t=E (0) to t=E (n). The encoding bit rate Renc is made to satisfy the relationship as Renc=R3. Since the rate Rout=Rx with which data is read from the encoder buffer 103 is higher than R3, the quantity of bits sharing the encoder buffer 103 is, as time elapses, returned to a safety state (returned to the safety state at time corresponding to point (h) in which the encoder buffer 103 does not overflow). Since the multiplexing bit rate Rmux set to the multiplexer 104 is higher than the encoding bit rate Renc set to the video encoder 102, the control for enlarging the output bit rate Rout from the encoder buffer 103 as compared with the encoding bit rate Renc of the video encoder 102 is automatically performed.

The encoder system shown in FIG. 3 is arranged to be adaptable to the above-mentioned buffer model and structured to perform the encoding operation in such a manner that the encoder buffer 103 does not overflow. Moreover, the encoder system according to this embodiment performs the encoding operation in such a manner that the receiving buffer (the decoder buffer) in the decoder portion does not overflow and underflow when the decoder decodes the bit stream produced by the system according to this embodiment. That is, the system according to this embodiment performs control in such a manner that the zigzag line indicating the quantity of bits sharing the encoder buffer 103 and shown in FIG. 4 does not move to a position above the line a-b-c-d. Moreover, another control is performed in such a manner that the line p-q-r-s does not move to a position above the line a-b-c-d.

To perform the above-mentioned control, the encoding bit rate Renc instructed by the bit-rate instructing unit 109 and the required quantity S7 of bits of the picture which must be encoded and which is instructed by the rate controller 110 must satisfy the following conditions:

If $k=0$, then $AA(0) \leq b0$

If $k \geq 1$, $$OBB(k) = \sum_{i=0}^{k-1} A(i) - \sum_{i=0}^{k-1} ((E(i-1) - E(i)) \times Rout(i)) \quad (1-1)$$

$$OB(k) = \sum_{i=0}^{k-1} A(i) - \sum_{i=0}^{k-1} ((E(i+1) - E(i)) \times Renc(i)) \quad (1-2)$$

$$X = BB - (OBB(k) - OB(k)) \quad (1-3)$$

$$X \geq B \quad (1-4)$$

$$AA(k) \leq B - OB(k) \quad (1-5)$$

where $AA(k) \geq 0$ $0 \leq OBB(k) \leq BB$ $0 \leq OB(k) \leq B$ where b0 is an initial quantity of bits sharing the receiving buffer (decoder buffer) of the decoder when the decoding operation has been started, BB is the size of the encoder buffer 103, B is the size of the virtual code buffer for use to control the rate, OBB (i) is the quantity of bits sharing the encoder buffer realized immediately before an i-th picture is encoded, OB (i) is the quantity of bits sharing the virtual code buffer realized immediately before the i-th picture is encoded, E (i) is time at which the i-th picture is encoded, A (i) is the quantity of bits of the i-th picture which must be encoded, AA (i) is the required quantity of bits of the i-th picture which must be encoded, Renc (i) is the encoding bit rate in a region between the i-th picture and an i+1 th picture, and Rout (i) is a data output bit rate from the encoder buffer in a region from the i-th picture to the i+1 th picture.

The factors OBB (i) and OB (i) are obtained by a buffer administrating circuit 111. Value X (t) obtained by the calculation in Equation (1-3) is a specific example of the parameter S12 indicating the degree of danger for the encoder buffer 103 to overflow. As shown in FIG. 4, the value X (t) at time t is indicated by the vertical distance from the line f-u-h and the line b-c-d at time t.

A fact is shown that the probability that the encoder buffer 103 overflows is proportion to the value X (t). At this time, the bit-rate instructing unit 109 performs control in such a manner that the encoding bit rate Renc is made to be a low value. That is, the bit-rate instructing unit 109 instructs the rate controller 110 of the encoding bit rate Renc in such a manner that Equation (1-4) is satisfied.

If data can be transmitted from the encoder buffer 103 as in a period following time t=E (m) shown in FIG. 4, the output bit rate Rout from the encoder buffer 103 is made to be higher than the encoding bit rate Renc set to the video encoder 102 in a case where the value X (t) is small and thus the risk that the encoder buffer 103 overflows is high. Thus, the value X (t) can be enlarged. As a result, the risk that the encoder buffer 103 overflows can be lowered.

Note that the rate controller 110 instructs the video encoder 102 of the value AA (i) which satisfies the condition expressed in Equation (1-5) as the required quantity S7 of bits of the i-th picture which must be encoded. The quantity S8 of bits which have actually been encoded by the video encoder 102 corresponds to the quantity A (i).

Since the system according to this embodiment performs the above-mentioned control, the encoding operation can be performed in such a manner that the encoder buffer 103 does not overflow and the decoder buffer in the decoder portion does not overflow and underflow.

The present invention is not limited to the above-mentioned embodiment. For example, the digital signal for use in the structure according to the present invention is not limited to the video signal. The present invention may be applied to also an audio signal. As a matter of course, a various modification may be permitted within the scope of the present invention.

Although the optical disk has been employed as the medium for recording signals in the structure shown in FIG. 3, signals encoded by the apparatus according to the present invention may be recorded on a tape-type recording medium, such as a magnetic tape, a magnetic disk medium, such as a hard disk or a flexible disk, and a medium for recording signals, such as a semiconductor storage medium, for example, a so-called an IC card and various memory devices. The optical disk may be any one of a variety of disks, such as a disk having pits for enabling data to be recorded, a magneto-optical disk, a phase-change-type optical disk, an organic-pigment-type optical disk, an optical disk on which data is recorded with an ultraviolet laser beam and an optical disk having a multi-layered recording films.

Although the structure shown in FIG. 3 is formed in such a manner that data is recorded on a package medium such as the optical disk, the present invention may be used in a broadcast or communication. The method of encoding a digital signal according to the present invention may be applied to a system in which transmission is temporarily interrupted in a state where the state of communication is unsatisfactory and an output from a transmission buffer of an encoder is sometimes interrupted so that the encoding bit rate which is set to the encoder is controlled. Thus, the encoding operation can successively be performed. When the present invention is applied to the communication or transmission, the system shown in FIG. 3 is arranged in such a manner that the modulation circuit 106 performs a predetermined modulation adaptable to the communication passage or the transmission passage. As an alternative to the recording head 107, an interface circuit is provided. Thus, the interface is established with the communication passage or the transmission passage through the interface circuit. If the state of the communication or the transmission is unsatisfactory, an output from the interface circuit is interrupted. Moreover, a signal indicating the state of the interruption is supplied to the buffer administrating circuit 111.In this case, the track controller 114 and the shock detector 112 shown in FIG. 3 detect the state of the communication. The other structures may be the same as those shown in FIG. 3.

According to the present invention, there are provided the method and apparatus for encoding a digital signal in such a manner that the transmission buffer for temporarily storing an encoded bit stream obtained by encoding a digital signal smoothes changes in the quantity of codes supplied in a short time and a bit stream is transmitted from the transmission buffer at a predetermined bit rate, the method of encoding a digital signal including the steps of administrating the quantity of bits which share the transmission buffer, and controlling the quantity of codes which are supplied to the transmission buffer in accordance with the quantity of bits which share the transmission buffer in a case of an output interruption state in which any bit stream cannot be transmitted from the transmission buffer. Thus, even if recording data on a recording medium is temporarily inhibited or even in a state in which communication or transmission cannot be performed is realized, overflow of the transmission buffer can be prevented. Therefore, the encoding operation can successively be performed. When an encoded bit stream is reproduced from a recording medium by expanding and decoding the same, any discontinuous reproduced image is not formed because disorder of the reproduced image and freezing of the reproduced image can be prevented. When the receiving portion of the transmission passage decodes the encoded bit stream, any discontinuous reproduced image is not formed because disorder of the reproduced image and freezing of the reproduced image can be prevented.

Although the invention has been described in its preferred form with a certain degree of particularity, it is understood that the present disclosure of the preferred form can be changed in the details of construction and in the combination and arrangement of parts without departing from the spirit and the scope of the invention as hereinafter claimed.

What is claimed is:

1. A method of encoding a digital signal in such a manner that a transmission buffer for temporarily storing an encoded bit stream obtained by encoding a digital signal smoothes changes in the quantity of codes supplied in a short time and a bit stream is transmitted from said transmission buffer at a predetermined bit rate, said method of encoding a digital signal comprising the steps of:

administrating the quantity of bits which share said transmission buffer;

detecting for an output interruption state in which no bit stream can be transmitted from said transmission buffer; and controlling the quantity of codes which are supplied to said transmission buffer in accordance with the quantity of bits which share said transmission buffer in the output interruption state so that the bit rate of the codes supplied to said transmission buffer is reduced.

2. A method of encoding a digital signal according to claim 1, wherein control of the quantity of codes which are supplied to said transmission buffer is performed by controlling the encoding bit rate of the encoded bit stream.

3. A method of encoding a digital signal according to claim 1, wherein control of the quantity of codes which are supplied to said transmission buffer is performed by controlling the quantity of bits which are allocated to encoding when digital signals for predetermined time are encoded.

4. A method of encoding a digital signal according to claim 2, wherein the control of the quantity of codes which are supplied to said transmission buffer is performed in such a manner that a parameter indicating a degree of danger that said transmission buffer overflows is calculated in accordance with the quantity of bits which share said transmission buffer, and the encoding bit rate is lowered in inverse proportion to the degree of danger that said transmission buffer overflows.

5. A method of encoding a digital signal according to claim 3, wherein the control of the quantity of codes which are supplied to said transmission buffer is performed in such a manner that a parameter indicating a degree of danger that said transmission buffer overflows is calculated in accordance with the quantity of bits which share said transmission buffer, and the quantity of bits which are allocated to encoding is lowered in inverse proportion to the degree of danger that said transmission buffer overflows.

6. A method of encoding a digital signal according to claim 1, wherein an output bit rate of the bit stream which is transmitted from said transmission buffer is controlled in accordance with the quantity of bits sharing said transmission buffer in a state of transmission in which the bit stream can be transmitted from said transmission buffer.

7. A method of encoding a digital signal according to claim 6, wherein the size of said transmission buffer is larger than the size of a virtual buffer for use to control the predetermined bit rate.

8. A method of encoding a digital signal according to claim 6, wherein a parameter indicating a degree of danger that said transmission buffer overflows is calculated in accordance with the quantity of bits which share said transmission buffer, and the output bit rate is controlled to be higher than the encoding bit rate of the encoded bit stream which is supplied to said transmission buffer when the parameter indicates that the degree of danger that the transmission buffer overflows is high.

9. A method of encoding a digital signal according to claim 1, wherein control is performed in such a manner that the output from said transmission buffer is interrupted when a predetermined external factor has been detected.

10. An apparatus for encoding a digital signal in such a manner that a transmission buffer for temporarily storing an encoded bit stream obtained by encoding a digital signal smoothes changes in the quantity of codes supplied in a short time and a bit stream is transmitted from said transmission buffer at a predetermined bit rate, said apparatus for encoding a digital signal comprising the steps of:

means for administrating the quantity of bits which share said transmission buffer;

means for detecting for an output interruption state in which said transmission buffer cannot transmit any bit stream; and control means for controlling the quantity of codes which are supplied to said transmission buffer in accordance with the quantity of bits which share said transmission buffer in the output interruption state so that the bit rate of the codes supplied to the transmission buffer is reduced.

11. An apparatus for encoding a digital signal according to claim 10, wherein said control means controls the quantity of codes which are supplied to said transmission buffer by controlling the encoding bit rate of the encoded bit stream.

12. An apparatus for encoding a digital signal according to claim 10, wherein said control means controls the quantity of bits which are allocated to encoding when digital signals for predetermined time are encoded to control the quantity of codes which are supplied to said transmission buffer.

13. An apparatus for encoding a digital signal according to claim 11, wherein said control means calculates a parameter indicating a degree of danger that said transmission buffer overflows in accordance with the quantity of bits which share said transmission buffer and lowers the encoding bit rate in inverse proportion to the degree of danger that said transmission buffer overflows.

14. An apparatus for encoding a digital signal according to claim 12, wherein said control means calculates a parameter indicating a degree of danger that said transmission buffer overflows in accordance with the quantity of bits which share said transmission buffer and lowers the quantity of bits which are allocated to encoding in inverse proportion to the degree of danger that said transmission buffer overflows.

15. An apparatus for encoding a digital signal according to claim 10, wherein said control means controls an output bit rate of the bit stream which is transmitted from said transmission buffer in accordance with the quantity of bits sharing said transmission buffer in a state of transmission in which the bit stream can be transmitted from said transmission buffer.

16. An apparatus for encoding a digital signal according to claim 15, wherein the size of said transmission buffer is larger than the size of a virtual buffer for use to control the predetermined bit rate.

17. An apparatus for encoding a digital signal according to claim 15, wherein said control means calculates a parameter indicating a degree of danger that said transmission buffer overflows in accordance with the quantity of bits which share said transmission buffer and raises the output bit rate to be higher than the encoding bit rate of the encoded bit stream which is supplied to said transmission buffer when the parameter indicates that the degree of danger that the transmission buffer overflows is high.

18. An apparatus for encoding a digital signal according to claim 10, wherein said detection means detects a fact that said transmission buffer is brought to an output interruption state when said detection has detected a predetermined external factor.

* * * * *